United States Patent
Wang et al.

(10) Patent No.: US 11,963,127 B2
(45) Date of Patent: Apr. 16, 2024

(54) LOCATION MANAGEMENT COMPONENT AND METHOD FOR A MOBILE COMMUNICATION NETWORK

(71) Applicant: HUAWEI TECHNOLOGIES CO., LTD., Shenzhen (CN)

(72) Inventors: Qi Wang, Munich (DE); Ömer Bulakci, Munich (DE); Emmanouil Pateromichelakis, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 426 days.

(21) Appl. No.: 17/221,168

(22) Filed: Apr. 2, 2021

(65) Prior Publication Data
US 2021/0274459 A1 Sep. 2, 2021

Related U.S. Application Data

(63) Continuation of application No. PCT/EP2018/077196, filed on Oct. 5, 2018.

(51) Int. Cl.
*H04W 64/00* (2009.01)
*H04W 12/02* (2009.01)
*H04W 12/63* (2021.01)

(52) U.S. Cl.
CPC .......... *H04W 64/00* (2013.01); *H04W 12/02* (2013.01); *H04W 12/63* (2021.01)

(58) Field of Classification Search
CPC ..... H04W 64/00; H04W 12/02; H04W 48/12; G01S 2205/008; G01S 5/0036; G01S 5/0054
See application file for complete search history.

(56) References Cited

U.S. PATENT DOCUMENTS

| 8,712,378 B1 | 4/2014 | Tarantino |
| 2007/0143779 A1* | 6/2007 | Kaarela ............. H04N 7/17318 348/E7.071 |

(Continued)

FOREIGN PATENT DOCUMENTS

| CN | 1475924 A | 2/2004 |
| CN | 101009929 A | 8/2007 |

(Continued)

OTHER PUBLICATIONS

"3rd Generation Partnership Project;Technical Specification Group Services and System Aspects;Study on Enhancement to the 5GC LoCation Services(Release 16)", 3GPP TR 23.731 V0.6.0, total 144 pages, 3rd Generation Partnership Project, Valbonne, France (Aug. 2018).

(Continued)

*Primary Examiner* — Justin Y Lee
(74) *Attorney, Agent, or Firm* — Leydig, Voit & Mayer, Ltd.

(57) ABSTRACT

A location management component (LMC) is provided for a mobile communication network. The LMC is configured to provide LMC configuration information, obtain privacy information relating to at least one user equipment (UE), obtain a location request according to the LMC configuration information, determine a position of the at least one UE based on the privacy information and the location request, and provide a location response comprising the determined position.

18 Claims, 20 Drawing Sheets

(56) References Cited

U.S. PATENT DOCUMENTS

| | | | |
|---|---|---|---|
| 2010/0173649 A1* | 7/2010 | Ishii | H04W 4/20 |
| | | | 455/456.2 |
| 2016/0088462 A1* | 3/2016 | Jin | H04W 36/0061 |
| | | | 455/456.5 |
| 2018/0199160 A1 | 7/2018 | Edge | |
| 2019/0166575 A1* | 5/2019 | Van Phan | G01S 1/00 |
| 2020/0037283 A1* | 1/2020 | Edge | H04W 64/00 |
| 2020/0053638 A1* | 2/2020 | Edge | H04W 4/029 |
| 2020/0077356 A1* | 3/2020 | Youn | H04W 68/02 |

FOREIGN PATENT DOCUMENTS

| | | |
|---|---|---|
| CN | 107534935 A | 1/2018 |
| WO | 2017196510 A1 | 11/2017 |

OTHER PUBLICATIONS

"3rd Generation Partnership Project;Technical Specification Group Services and System Aspects;Procedures for the 5G System;Stage 2(Release 15)", 3GPP TS 23.502 V15.1.0, total 285 pages, 3rd Generation Partnership Project, Valbonne, France (Mar. 2018).

"3rd Generation Partnership Project;Technical Specification Group Services and System Aspects;Functional stage 2 description of Location Services (LCS)(Release 14)", 3GPP TS 23.271 V14.2.0, total 183 pages, 3rd Generation Partnership Project, Valbonne, France (Jun. 2017).

"3rd Generation Partnership Project;Technical Specification Group Radio Access Network;Study on Scenarios and Requirements for Next Generation Access Technologies;(Release 15)", 3GPP TR 38.913 V15.0.0, total 39 pages, 3rd Generation Partnership Project, Valbonne, France (Jun. 2018).

"3rd Generation Partnership Project;Technical Specification Group Radio Access Network;Evolved Universal Terrestrial Radio Access (E-UTRA);LTE Positioning Protocol (LPP)(Release 15)", 3GPP TS 36.355 V15.1.0, total 217 pages, 3rd Generation Partnership Project, Valbonne, France (Sep. 2018).

"3rd Generation Partnership Project;Technical Specification Group Radio Access Network;NR;Radio Resource Control (RRC) protocol specification(Release 15)", 3GPP TS 38.331 V15.3.0, total 445 pages, 3rd Generation Partnership Project, Valbonne, France (Sep. 2018).

"3rd Generation Partnership Project;Technical Specification Group Radio Access Network;NG-RAN;NG Application Protocol (NGAP)(Release 15)", 3GPP TS 38.413 V15.1.0, total 295 pages, 3rd Generation Partnership Project, Valbonne, France (Sep. 2018).

"3rd Generation Partnership Project;Technical Specification Group Radio Access Network;NG-RAN;NR Positioning Protocol A (NRPPa) (Release 15)", 3GPP TS 38.455 V15.1.0, total 60 pages, 3rd Generation Partnership Project, Valbonne, France (Sep. 2018).

"LCS architecture enhancement addressing Key Issue #1 in TR 23.731," SA WG2 Meeting #127, S2-184036, Sanya, China, Total 3 pages 3rd Generation Partnership Project, Valbonne, France (Apr. 16-20, 2018).

* cited by examiner

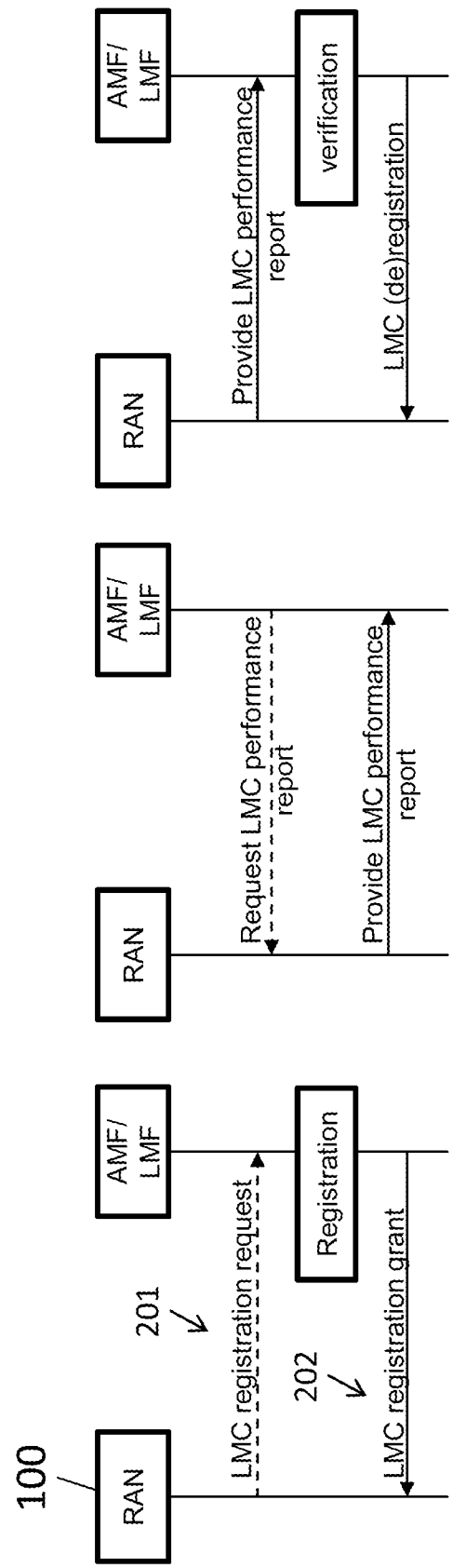

LOCATION MANAGEMENT COMPONENT AND METHOD FOR A MOBILE COMMUNICATION NETWORK

CROSS-REFERENCE TO RELATED APPLICATIONS

This application is a continuation of International Application No. PCT/EP2018/077196, filed on Oct. 5, 2018, the disclosure of which is hereby incorporated by reference in its entirety.

FIELD

The present disclosure relates to a location management component (i.e. a device) and a method for determining a position of a mobile device in a mobile communication network. The present disclosure in particular relates to a hierarchical location service (LCS), preferably in 5G new radio (NR).

BACKGROUND

Given the new potentials of the NR access technology (RAT), 5G location/positioning service target to meet a full set of performance requirements, e.g. support for a range of accuracy levels, latency levels and device categories, thereby allowing for efficient signaling over the air interface and in a mobile communication network, support for hybrid positioning methods, scalability in terms of large number of devices (cf. e.g. 3GPP TR 38.913). In 3GPP TR 23.731, a hierarchical LCS architecture has been proposed (cf. FIG. 18), where a Location Management Function (LMF) serves as a centralized location server in a Core Network (CN). A conventional distributed Location Management Component (LMC) deployed in a Radio Access Network (RAN) and in a user equipment (UE) serve as local LMF, providing LCS to its vicinity.

In conventional technology cellular mobile radio systems, three types of location requests (LRs) are specified, namely a Mobile-Originated Location Request (MO-LR), a Mobile-Terminated Location Request (MT-LR) and a Network Induced Location Request (NI-LR). All of them are handled in the CN.

Taking MO-LR as an example, the procedure in FIG. 19 allows a UE in E-UTRAN to request either its own location and optionally, velocity or location assistance data. This procedure is based on the assumption that a centralized location server, namely E-SMLC, is deployed in the CN. In order to calculate a target UE's position, location measurements obtained in the RAN must be sent to the E-SMLC, which causes high latency and heavy signaling overhead.

In 3GPP TR 23.731, procedures for supporting distributed LMF (LMFd) deployment have been proposed. It is assumed that LMFd is located close to or at the access network site. For MO-LRs, the procedure in FIG. 20 allows an Access Management Function (AMF) to select an LMFd, which is close to a target UE, so that the interface for location operation between LMFd and gNB/UE is as short/fast as possible. Alternatively, LMF selection may be carried out by a centralized LMF (LMFc). However for both options, the latency improvement is obtained by deploying many AMF and LMFd close to the edge of the network which results in higher deployment cost and more frequent inter-AMF mobility.

That is, location management according to the conventional technology suffers from high latency and heavy signaling overhead, as well as from high deployment costs.

SUMMARY

In view of the above-mentioned problems and disadvantages, the present disclosure improves the conventional location management component.

The present disclosure provides a location management component and method for a mobile communication network, which employs new procedures and signaling for handling different types of LRs using a hierarchical LCS architecture in order to meet the above mentioned service requirements of 5G LCS.

The present disclosure in particular provides new procedures and signaling mechanism allowing an LR to be handled within RAN, more specifically, allowing an LMC in RAN to obtain LCS authorization information from a CN, to receive a LR and provide LCS to a client, and to configure location measurements and reports required for UE localization. Other location preparation procedures, which may be implemented according to the present disclosure, include RAN-LMC registration procedure between a RAN and a CN, and RAN-LMC configuration notification procedure between a RAN and a UE.

A first aspect of the present disclosure provides a location management component, LMC, for a mobile communication network, wherein the LMC is configured to provide LMC configuration information, obtain privacy information relating to at least one user equipment, UE, obtain a location request according to the LMC configuration information, determine a position of the at least one UE, based on the privacy information and the location request, and provide a location response comprising the determined position.

This is beneficial, as signaling overhead to the CN, as well as overall latency of location management is reduced. With the LMC configuration information provided by the LMC, a UE is made aware of e.g. a location server function nearby, and therefore may determine the destination of LRs correspondingly. Further, latency of location management is reduced as the LCS is handled by the LMC. The present disclosure also allows for enhanced load balancing and scalability.

In particular, to provide comprises to relay, to send, to transmit, and/or to store (e.g. in a database).

In particular, to obtain comprises to relay, to receive, and/or to fetch (e.g. from a database).

In an implementation form of the first aspect, the LMC is for being located in at least one network domain, in particular a Radio Access Network, RAN.

In an implementation form of the first aspect, the LMC is further configured to provide the LMC configuration information to at least one UE.

In an implementation form of the first aspect, the LMC configuration information is non UE-specific and the LMC is further configured to provide the LMC configuration information to the at least one UE, in particular included in a predefined system information block, SIB.

In an implementation form of the first aspect, the non UE-specific LMC configuration information includes at least one of the following parameters: a capability of the LMC with respect to a target geographical area, at least one type of location request allowed at the LMC, at least one type of location service, LCS, with at least one quality of service, QoS, such as accuracy and latency supported, a resource configuration for location request transmission, a measurement report required by the RAN.

In an implementation form of the first aspect, the LMC configuration information is UE-specific and wherein the LMC is further configured to transmit the LMC configuration information to the at least one UE, in particular included in a radio resource control, RRC, message.

In an implementation form of the first aspect, the UE-specific LMC configuration information includes information indicating at least one of the following: a capability of the LMC with respect to a specific UE or a specific group of UEs, at least one type of a location request allowed at the LMC, at least one location service, LCS, quality of service, QoS, such as accuracy and latency supported, a resource configuration for location request transmission, a measurement report required by the RAN.

In an implementation form of the first aspect, the LMC is further configured to: provide an LCS authorization request, in particular to a core network, CN, and obtain an LCS authorization response, in particular from the CN, wherein the LMC is further configured to obtain the privacy information based on the LCS authorization response.

This is in particular beneficial, as the LMC may start an LCS authorization procedure before a LR arrives, so that the positioning procedure for specific UEs can be carried out within RAN, resulting in a reduced latency and signaling overhead. When an LR arrives, no interaction between the LMC and e.g. the CN is required, which potentially reduces overall latency of LCS.

In an implementation form of the first aspect, the obtaining of the privacy information is triggered by a UE, by the RAN or by the CN, and wherein the LMC configuration information provided by the LMC is UE-specific LMC configuration information.

In an implementation form of the first aspect, the obtaining of the location request according to the LMC configuration information comprises obtaining a mobile originated location request, MO-LR, from a UE, preferably included in an RRC message.

In an implementation form of the first aspect, the obtaining of the location request according to the LMC configuration information comprises obtaining a mobile terminated location request, MT-LR, from an access and mobility management function, AMF, preferably included in an application protocol, NGAP, message, or from an location management function, LMF, preferably included in a positioning protocol, NRPPa, message.

In an implementation form of the first aspect, the providing of the location response comprises providing the location response to a UE, preferably included in an RRC message.

In an implementation form of the first aspect, the providing of the location response comprises providing the location response to an AMF, preferably included in an NGAP message, or to an LMF, preferably included in an NRPPa message.

In an implementation form of the first aspect, the LMC is further configured to in particular provide a location measurement configuration to a UE, to obtain a location measurement report from the UE, and to determine the position according to the location measurement report.

In an implementation form of the first aspect, the LMC is further configured to provide a registration request, preferably to an AMF or an LMF, obtain a registration grant, preferably from the AMF or the LMF, provide the LMC configuration information based on the registration grant.

In an implementation form of the first aspect, the LMC configuration information comprises at least one of an LCS type, an LCS category, an LCS QoS, a capability level of the LMC, a positioning method, a location measurement type, a location measurement frequency, an LMC active time, an LMC expiry time, a geographical area of the LMC, an RNA list relating to the LMC.

A second aspect of the present disclosure provides a method for a location management component, LMC, for a mobile communication network, wherein the method comprises the operations of providing, by the LMC, LMC configuration information, obtaining, by the LMC, privacy information relating to at least one user equipment, UE, obtaining, by the LMC, a location request according to the LMC configuration information, determining, by the LMC, a position based on the privacy information and the location request, and providing, by the LMC, a location response comprising the determined position.

In particular, to provide comprises to relay, to send, to transmit, and/or to store (e.g. in a database).

In particular, to obtain comprises to relay, to receive, and/or to fetch (e.g. from a database).

In an implementation form of the second aspect, the LMC is for being located in at least one network domain, in particular a Radio Access Network, RAN.

In an implementation form of the second aspect, the method further comprises the operation of providing the LMC configuration information to at least one UE.

In an implementation form of the second aspect, the LMC configuration information is non UE-specific and the method further comprises the operation of providing the LMC configuration information to the at least one UE, in particular included in a predefined system information block, SIB.

In an implementation form of the second aspect, the non UE-specific LMC configuration information includes at least one of the following parameters: a capability of the LMC with respect to a target geographical area, at least one type of location request allowed at the LMC, at least one type of location service, LCS, with at least one quality of service, QoS, such as accuracy and latency supported, a resource configuration for location request transmission, a measurement report required by the RAN.

In an implementation form of the second aspect, the LMC configuration information is UE-specific and the method further comprises the operation of transmitting the LMC configuration information to the at least one UE, in particular included in a radio resource control, RRC, message.

In an implementation form of the second aspect, the UE-specific LMC configuration information includes information indicating at least one of the following: a capability of the LMC with respect to a specific UE or a specific group of UEs, at least one type of a location request allowed at the LMC, at least one location service, LCS, quality of service, QoS, such as accuracy and latency supported, a resource configuration for location request transmission, a measurement report required by the RAN.

In an implementation form of the second aspect, the method further comprises the operations of providing an LCS authorization request, in particular to a core network, CN, and obtaining an LCS authorization response, in particular from the CN, wherein the method further comprises the operation of obtaining the privacy information based on the LCS authorization response.

In an implementation form of the second aspect, the obtaining of the privacy information is triggered by a UE, by the RAN or by the CN, and wherein the LMC configuration information provided by the LMC is UE-specific LMC configuration information.

In an implementation form of the second aspect, the obtaining of the location request according to the LMC configuration information comprises obtaining a mobile originated location request, MO-LR, from a UE, preferably included in an RRC message.

In an implementation form of the second aspect, the obtaining of the location request according to the LMC configuration information comprises obtaining a mobile terminated location request, MT-LR, from an access and mobility management function, AMF, preferably included in an application protocol, NGAP, message, or from an location management function, LMF, preferably included in a positioning protocol, NRPPa, message.

In an implementation form of the second aspect, the providing of the location response comprises providing the location response to a UE, preferably included in an RRC message.

In an implementation form of the second aspect, the providing of the location response comprises providing the location response to an AMF, preferably included in an NGAP message, or to an LMF, preferably included in an NRPPa message.

In an implementation form of the second aspect, the method further comprises the operation of, in particular providing a location measurement configuration to a UE, obtaining a location measurement report from the UE, and determining the position according to the location measurement report.

In an implementation form of the second aspect, the method further comprises the operation of providing a registration request, preferably to an AMF or an LMF, obtaining a registration grant, preferably from the AMF or the LMF, and providing the LMC configuration information based on the registration grant.

In an implementation form of the second aspect, the LMC configuration information comprises at least one of an LCS type, an LCS category, an LCS QoS, a capability level of the LMC, a positioning method, a location measurement type, a location measurement frequency, an LMC active time, an LMC expiry time, a geographical area of the LMC, an RNA list relating to the LMC.

The method according to the second aspect and its implementation forms comprise the same advantages as the component according to the first aspect and its implementation forms.

It has to be noted that all devices, elements, units and means described in the present application could be implemented in the software or hardware elements or any kind of combination thereof. All operations which are performed by the various entities described in the present application as well as the functionalities described to be performed by the various entities are intended to mean that the respective entity is adapted to or configured to perform the respective operations and functionalities. Even if, in the following description of exemplary embodiments, a specific functionality or operation to be performed by external entities is not reflected in the description of a specific detailed element of that entity which performs that specific operation or functionality, it should be clear for a skilled person that these methods and functionalities can be implemented in respective software or hardware elements, or any kind of combination thereof.

BRIEF DESCRIPTION OF DRAWINGS

The above-described aspects and implementation forms of the present disclosure will be explained in the following description of exemplary embodiments in relation to the enclosed drawings, in which

FIGS. 2A-2C shows schematic views of a procedure performed by the LMC according to the present disclosure;

DETAILED DESCRIPTION

Figure 1:
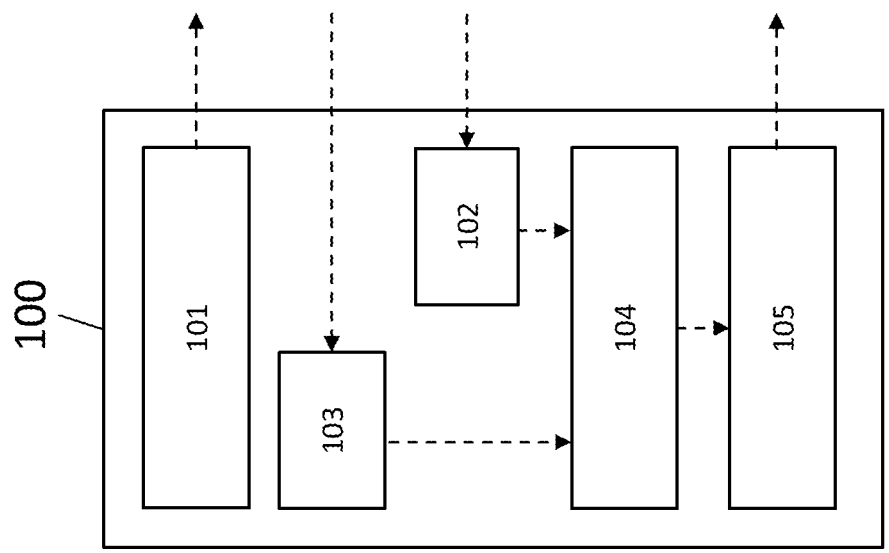
FIG. 1 shows a schematic view of an LMC according to an embodiment of the present disclosure.

FIG. 1 shows a schematic view of an LMC 100 according to an embodiment of the present disclosure.

FIG. 1 shows a location management component, LMC, 100 according to an embodiment of the present disclosure. The LMC is for being used in a mobile communication network.

Therefore, as illustrated in FIG. 1, the LMC 100 is configured to provide LMC configuration information 101, 301, 302. The LMC 100 is further configured to obtain privacy information 102 relating to at least one user equipment, UE, and to obtain a location request 103 according to the LMC configuration information 101, 301, 302.

To allow for location management, the LMC is further configured to determine a position 104 of the at least one UE, based on the privacy information 102 and the location request 103.

The determined position 104 is then provided comprised in provide a location response 105.

In particular, to provide comprises to relay, to send, to transmit, and/or to store (e.g. in a database). In particular, to obtain comprises to relay, to receive, and/or to fetch (e.g. from a database).

The operations, which the LMC 100 is configured to perform, are now going to be described in detail in view of FIG. 2 to FIG. 8. The described details are optional details of the LMC 100. In the following, the LMC 100 may also be called RAN-LMC 100.

The present disclosure in particular provides network positioning procedures considering a hierarchical LCS architecture, in particular an LCS architecture with an LMC in a RAN. In order to enable LR handling at a RAN-LMC, the signaling procedures of FIG. 2 to FIG. 8 are now going to be described.

FIG. 2 shows RAN-LMC 100 registration at an AMF/LMF.

As a prerequisite procedure before any LR 103 can be sent to a RAN-LMC 100, the RAN-LMC 100 registers itself to the AMF or to the LMF in the CN. The AMF or LMF can store an identifier of the RAN-LMC 100.

FIG. 2A shows a basic procedure for RAN-LMC 100 registration. The LMC registration may be granted directly (i.e. by a registration grant 202) by AMF/LMF or triggered by a registration request 201 sent by the RAN. In case that a RAN-LMC 100 is registered at AMF, the communication is based on a protocol, which is used over the interface between the RAN and the AMF, such as NGAP over N2 interface (cf. 3GPP TS 38.413). This procedure may be combined with existing procedures, for example, NG setup or RAN configuration update described in 3GPP TS 38.413. In case that a RAN-LMC 100 is registered at LMF, a different protocol between RAN and LMF, such as NRPPa (cf. 3GPP TS 38.455), might be used.

LMC registration also allows the network function, such as the AMF and the LMF, to communicate with the RAN-LMC 100 for management purpose, such as performance reporting, as e.g. shown in FIG. 2B. Alternatively, the performance reporting and LMC registration procedures can be combined, as shown in FIG. 2C.

FIG. 3 shows RAN-LMC configuration notification.

After a RAN-LMC 100 is registered, it may announce its functionality to UEs by distributing LMC configuration information 101, 301, 302 to a UE or a group of UEs. The LMC configuration information 101, 301, 302 may consists of:
 A capability level of the RAN-LMC 100, e.g. types of LCS supported or a corresponding identifier, LCS QoS supported including accuracy and latency, positioning methods, location measurement types, frequency etc.
 Time information: e.g. for how long RAN-LMC stays active, expiry time.
 Geographical area, e.g., RAN-based notification area list.

The LMC configuration information 101, 301, 302 may be either UE-specific 302 or non-UE-specific 301.

Figure 3B:
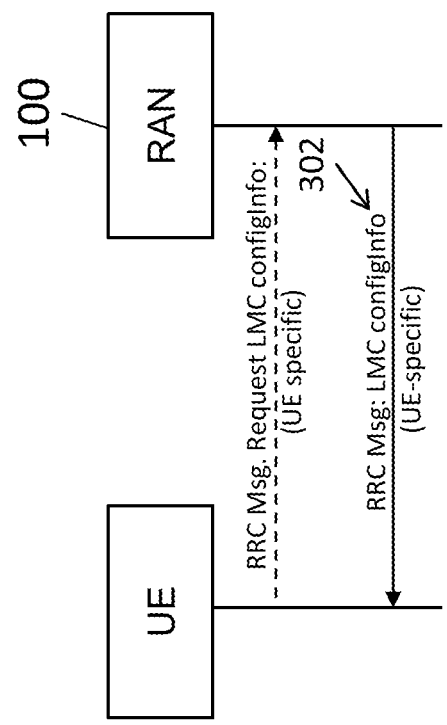
FIGS. 3A and 3B show schematic views of a procedure performed by the LMC according to the present disclosure.
Figure 3A:
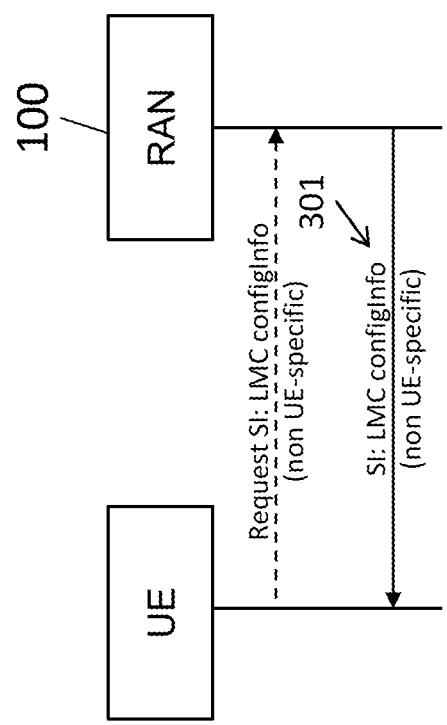

The non-UE-specific LMC configuration information 301 may be contained in a new type of system information block (SIB). The SIB may be broadcasted to the UEs within a certain area or multicast to a group of UEs. The transmission of non-UE-specific LMC configuration information 301 can be triggered by a UE in any RRC state, namely RRC idle, RRC inactive or RRC connected. Triggered by a UE, the SIB containing the LMC configuration information 301 may be delivered to UEs in on-demand manner, as shown in FIG. 3A. As an example, the procedure for requesting on-demand system information is defined in 3GPP TS 38.331. Alternatively, the SIB transmission may be triggered by the network, namely no request from the UE side is necessary.

The LMC configuration information 302 may also be UE-specific 302. In this case, the LMC configuration information 302 indicates the capability of the RAN-LMC 100 with respect to the specific UE or a specific group of UEs, for instance, types of LR 103 allowed at RAN-LMC 100, LCS QoS such as accuracy and latency supported, resource configuration of LR transmission and/or measurement report required by RAN, etc. The UE-specific LMC configuration information 302 may be contained in an RRC Message and transmitted to a specific UE or a group of UEs. The transmission may be triggered by a UE originated request message or by the network. An example of signaling procedure is given in FIG. 3B.

Figure 4:
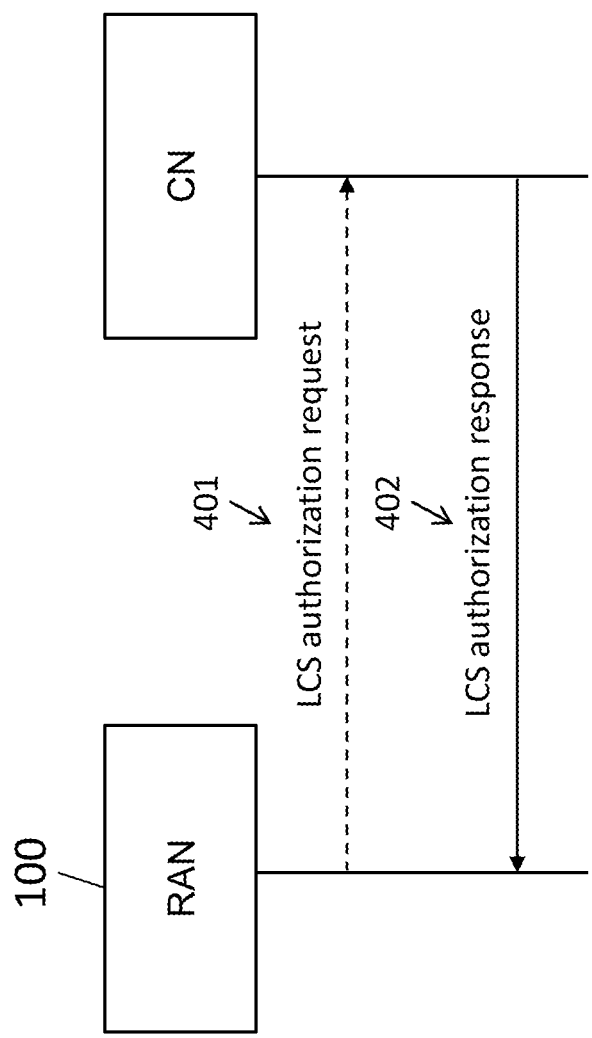
FIG. 4 shows another schematic view of a procedure performed by the LMC according to the present disclosure.
Figure 5:
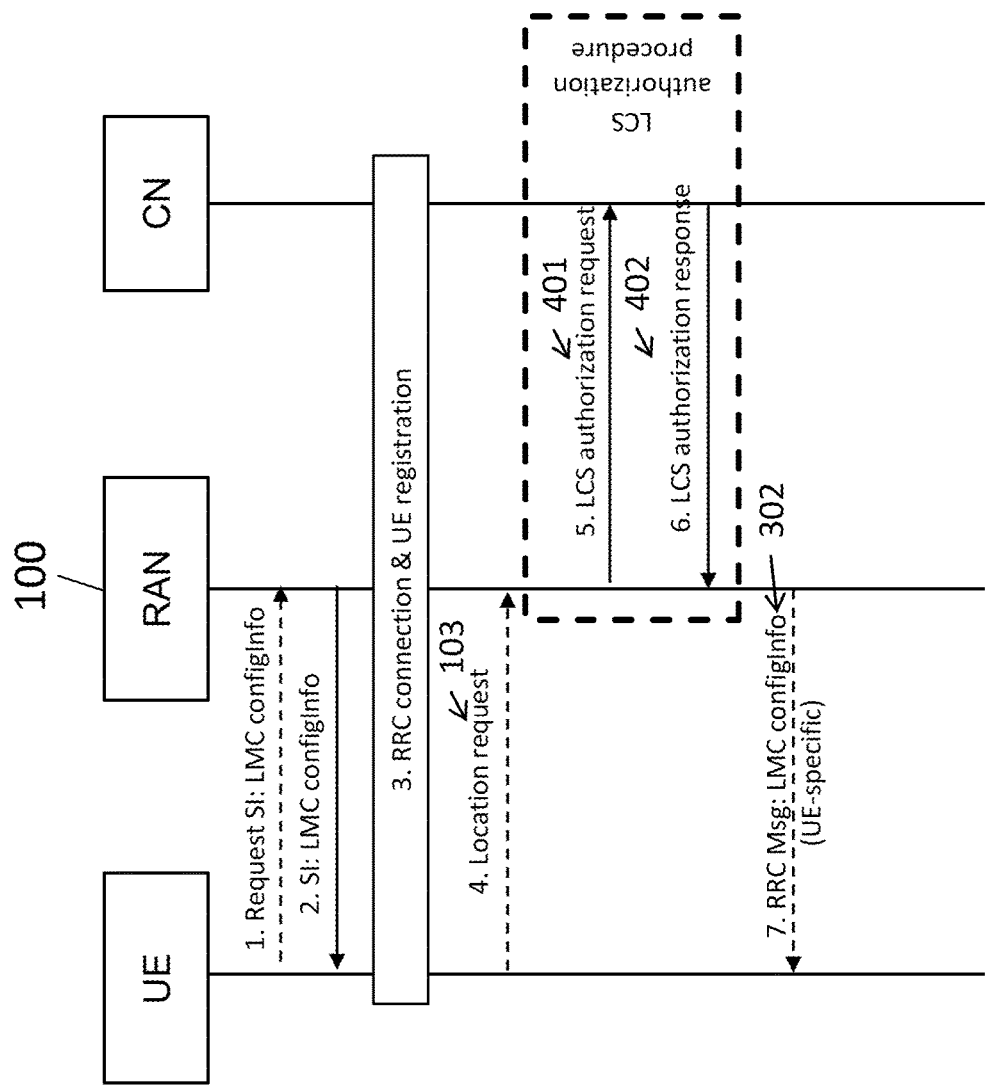
FIG. 5 shows another schematic view of a procedure performed by the LMC according to the present disclosure.
Figure 6:
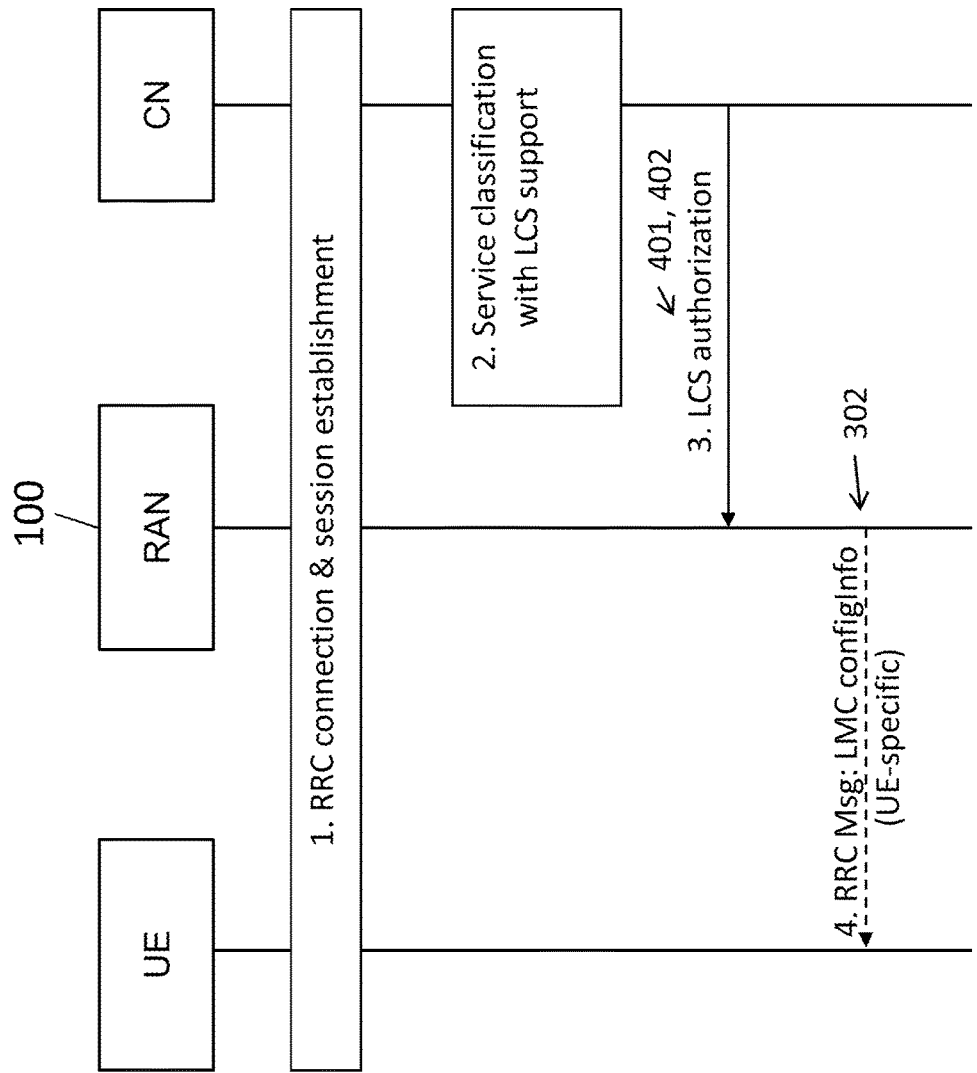
FIG. 6 shows another schematic view of a procedure performed by the LMC according to the present disclosure.

FIGS. 4, 5 and 6 show RAN LCS authorization.

A RAN LCS authorization procedure allows a RAN to obtain privacy information 102 (which is also called privacy-related information 102 in the following) with respect to a UE subscriber, so that the RAN is authorized to obtain the UE's location and/or provide a service based on the location information. In order to obtain privacy-related information 102 from the CN, the RAN sends an LCS authorization request 401 to the CN and receives a response 402 from the CN, as depicted in FIG. 4. The LCS authorization request 401 may be an LCS Authorization Request 401 without location estimate (send by RAN before location request 103); or an LCS Authorization Request 401 with location estimate (to check location related privacy settings).

As it is described in the following, the RAN LCS authorization procedure may be triggered by a UE:

The UE may trigger RAN LCS authorization explicitly by sending a LR 103 to the RAN (operation 4 in FIG. 5). Alternatively, the RAN may trigger LCS authorization for a specific UE based on UE's connection information or registration information without a LR 103. For instance, if a UE has acquired on-demand system information (SI) consisting of RAN-LMC configuration information 101, 301, 302 (operation 1 and operation 2 in FIG. 5), the RAN may trigger the RAN LCS authorization procedure once this UE enters the RRC connected state (operation 3 in FIG. 5). In this case, the RAN LCS authorization procedure is triggered implicitly. After this procedure is carried out, RAN may provide corresponding UE-specific LMC configuration information 302 to the respective UE using e.g. a RRC message (operation 7 in FIG. 5).

As it is now going to be described, RAN LCS authorization procedure may also be triggered by the network:

The RAN LCS authorization procedure may be triggered by an event within the CN or another service, which subscribes LCS, as shown in FIG. 6. Once an RRC connection is established, a UE registers for network LCS during the registration phase. A trigger event occurs within the network, e.g. a UE within a particular area, the UE subscribes a service which triggers LCS automatically (Operation 2), e.g. platooning. A CN function, e.g. AMF, GMLC, NEF, LMF, starts an LCS authorization procedure within the CN and checks whether the RAN is allowed to obtain a specific UE's location. As a result, the CN provides UE-specific LCS authorization information to the RAN (Operation 3), so that a further positioning procedure may be taken over by RAN. If the LCS authorization without location estimate was triggered, the RAN may provide UE-specific LMC configuration information 302 to the UE (Operation 4) so that the UE may send a LR 103 to the RAN. Otherwise, the RAN continues with the positioning procedure.

The following attributes may be identified for a RAN LCS authorization request information flow: target UE identity (if needed), indication on the session related LR 103, LCS client identity (such as external or internal), LCS client type, LCS client name, service type, requestor identity, type of location (current, last known, initial), UE velocity, LCS capability of RAN-LMC 100, type of deferred LR 103, geographic area for change of area event, parameters for periodic location event, etc. The RAN LCS authorization response information may indicate: types of location request allowed, class of privacy supported, additional privacy check required, etc. Depending on the specific CN function, which handles the LCS authorization within the CN, the RAN LCS authorization request 401/response 402 may be delivered using a different protocol or interface. For instance, in case that an AMF handles intra-CN procedure, the RAN LCS authorization request 401/response 402 may be communicated over N2; in case that LMF handles intra-CN procedure, the LTE Positioning Protocol (LPP) between RAN and LMF can be utilized (cf. 3GPP TS 36.355).

Advantages: RAN may start LCS authorization procedure before LR 103 arrives, so that the positioning procedure for specific UEs can be carried out within RAN, resulting in a reduced latency and signaling overhead.

Figure 7:
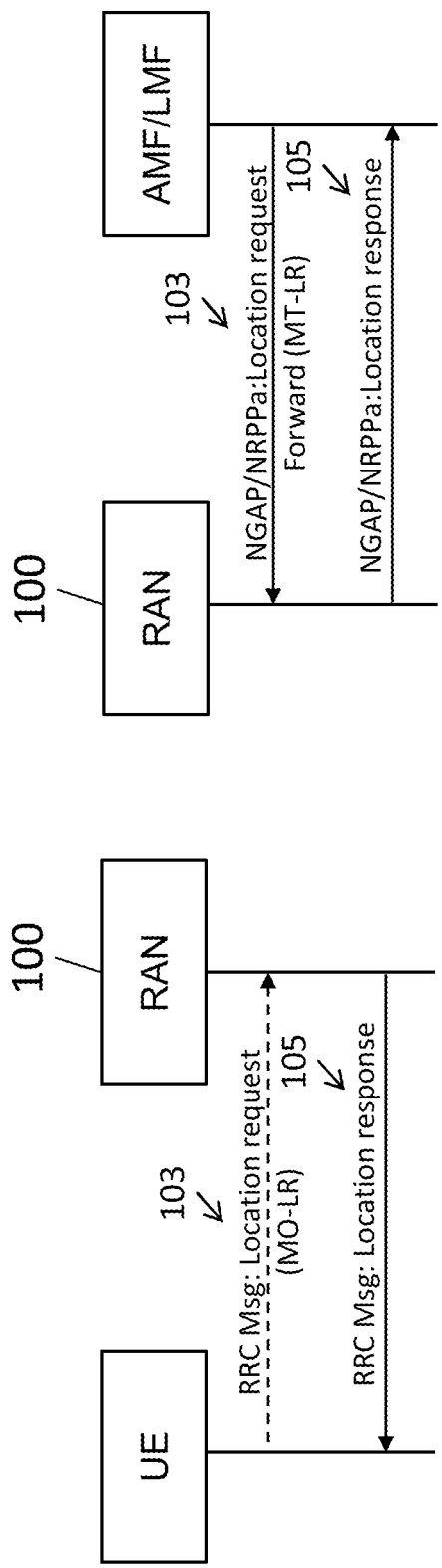
FIG. 7 shows another schematic view of a procedure performed by the LMC according to the present disclosure.

FIG. 7 shows a location request 103 and response 105.

For a LR 103 (i.e. a location request 103) originated from the UE side, in order to enable the RAN-LMC 100 to handle the LR 103, new RRC procedures are introduced allowing the LR 103 to be sent from the UE to the RAN and the location response 105 to be sent from the RAN to the UE. An exemplary procedure is shown in FIG. 7A. The types of LRs 103 may refer to the state of the Art (e.g. 3GPP TS 23.271). Based on the RAN-LMC configuration information 101, 301, 302 and a required LCS type and QoS, a UE may determine the destination of a MO-LR, namely either to a LMF in CN over NAS or to a RAN-LMC over RRC.

For a LR 103 originated from the network side, a new procedure is provided allowing the LR 103 to be forwarded from the CN to the RAN and the location response 105 to be reported from the RAN to CN, as depicted in FIG. 7B. Depending on the network function in the CN managing the LRs 103, different communication interfaces may be used. For example, if LRs 103 are forwarded by AMF, NGAP may be used; if LRs 103 are forwarded by LMF, NRPPa may be considered.

Figure 8:
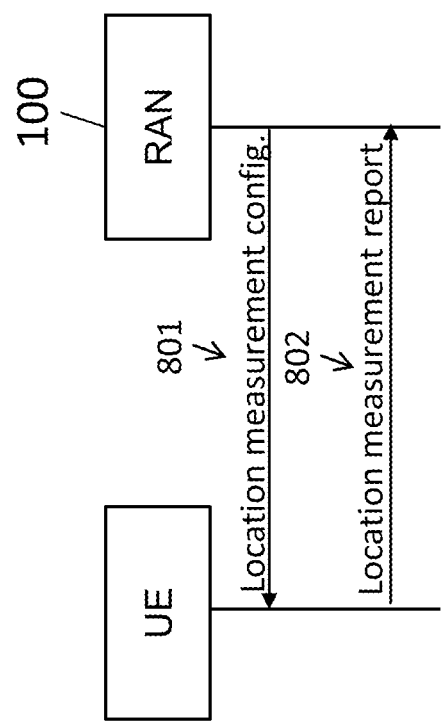
FIG. 8 shows another schematic view of a procedure performed by the LMC according to the present disclosure.

FIG. 8 shows location measurement configuration 801 and report 802 over RRC.

Authorized to provide a LCS to specific UEs, the RAN-LMC 100 is entitled to configure location related measurements using the RRC protocol. New fields may be introduced to RRC measurement and report configuration messages 801 to include location related measurements, e.g. Reference Signal Time Difference (RSTD), angle difference etc. Alternatively, new information element may be defined dedicated to location measurement reporting 802, like it was for LPP. RAN may include additional measurement objects required for positioning. The UEs carry out location related measurements and report the measurements to RAN-LMC 100 as configured. An example of measurement configuration 801 and reporting 802 procedure is shown in FIG. 8.

In the following section, different LR 103 types are discussed in the example embodiments that are going to be described in view of FIG. 9 to FIG. 16. Since the LMC 100 is located in the RAN, it may also be called RAN 100 or RAN-LMC 100.

A MO-LR sent to a RAN-LMC 100 is now going to be described in view of FIG. 9 to FIG. 12.

MO-LR refers to a LR 103 originated from the UE side. Based on the LMC configuration information 101, 301, 302 received, the UE may send the LR 103 directly to a RAN-LMC 100 and obtain an LCS from the RAN 100.

Figure 9:
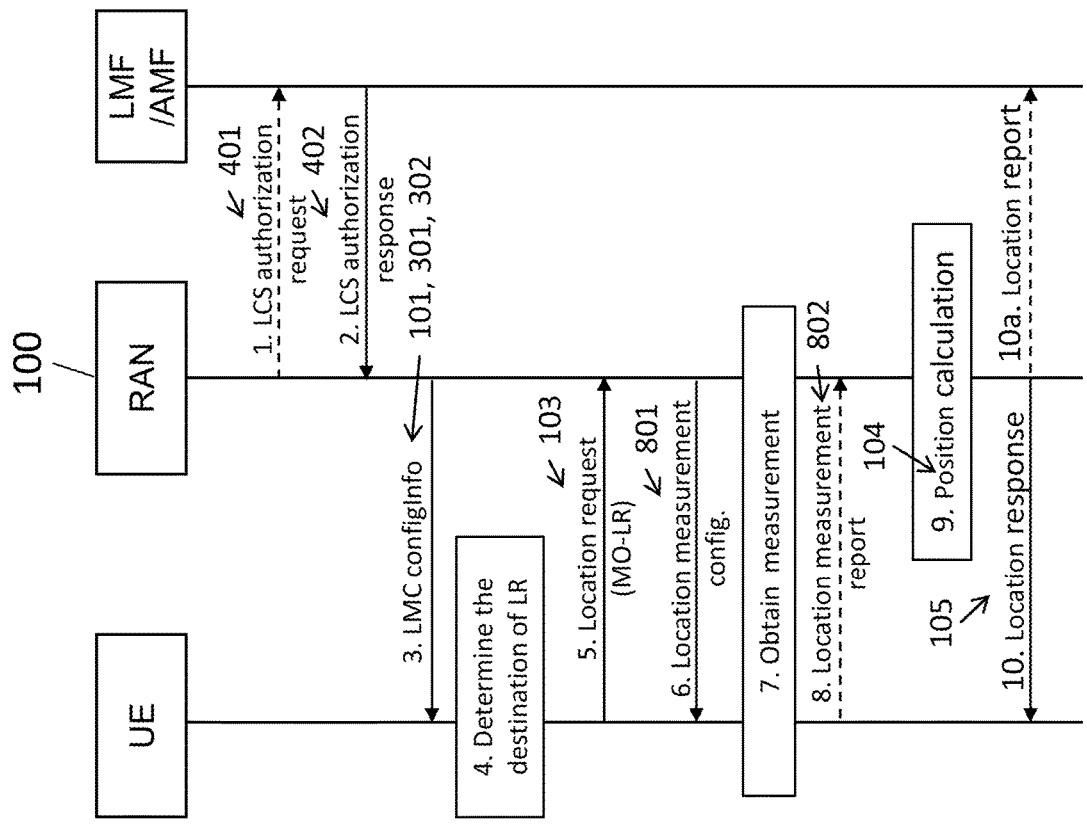
FIG. 9 shows another schematic view of a procedure performed by the LMC according to the present disclosure.

The signaling procedure shown in FIG. 9 can be described as:

1) RAN 100 triggers RAN LCS authorization procedure for a specific UE by sending LCS authorization request 401 without location estimate to the network function in CN, e.g. AMF, LMC or NEF.
2) The RAN LCS authorization may be triggered by a CN by sending an LCS authorization response 402 for a specific UE to the RAN 100, authorizing RAN-LMC 100 to take over a location server function for this UE. If triggered by the CN, operation 1 is omitted.
3) The RAN 100 informs the specific UE by sending LMC configuration information 101, 301, 302 which indicates the LCS capability of the RAN-LMC 100.
4) When the LR 103 arrives, the UE may determine the destination of the LR based on RAN-LMC configuration information 101, 301, 302.
5) The UE sends a MO-LR to the RAN 100 using RRC signaling procedure.
6) The RAN-LMC 100 receives the MO-LR and configures the required location measurement 801. In case that downlink measurements are involved, the RAN-LMC 100 informs UE about the reference signal used for measurements, type, timing, periodicity of measurements to make, as well as reporting configurations. In case that uplink measurements are required, the RAN-LMC 100 informs the UE about the type and configuration of uplink reference signals to transmit if needed.
7) Location measurements are obtained by either the UE or the RAN 100.
8) In case of downlink measurements configured, the UE reports location measurements 802 to the RAN 100 as configured.
9) The RAN-LMC 100 calculates the UE's position 104 based on at least the location measurements (which are in particular based on the privacy information 102 and on the location request 103) obtained.
10) The RAN 100 sends a location response 105 to the UE using RRC elementary procedure. Optionally, the RAN-LMC 100 reports the UE location to a centralized location server, e.g. LMF.

The procedure shown in FIG. 9 allows the RAN 100 to initiate LCS authorization prior before any LR 103 occurs. When an LR 103 arrives (operation 5), no interaction between the RAN 100 and the CN is required, which potentially reduces overall latency of LCS.

Figure 10:
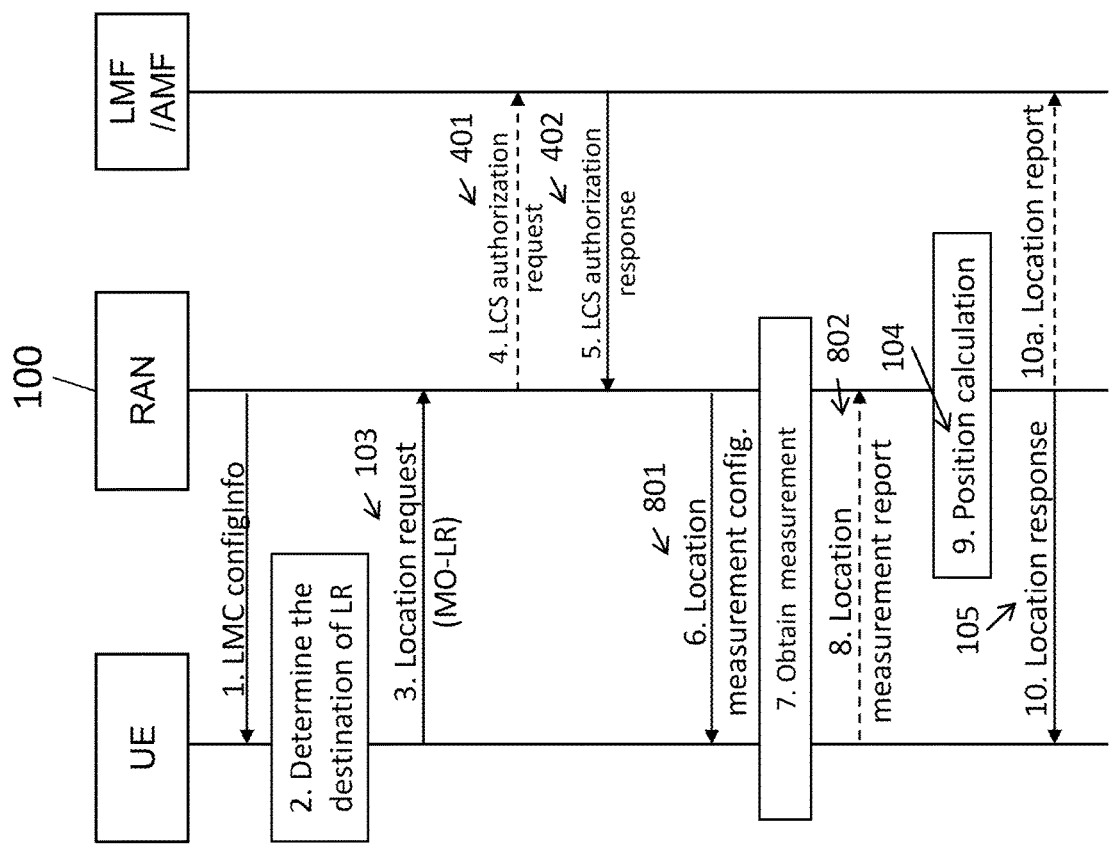
FIG. 10 shows another schematic view of a procedure performed by the LMC according to the present disclosure.

Alternatively, the RAN LCS authorization procedure can be triggered after an LR 103 arrives from the UE, as e.g. shown in FIG. 10. This results in higher latency than the prior scheme discussed in FIG. 9. However compared to the conventional technology solution, where location measurements are configured and obtained in the CN, the RRC procedure of the present disclosure allows location measurements to be configured and obtained at the RAN 100 (operation 6 and operation 8), and the UE location to be calculated at the RAN-LMC 100 (operation 9), and thus significantly reduces the signaling overhead to the CN.

In addition, the RAN-LMC 100 may also handle deferred MO-LRs where the LCS responses are triggered by certain events. Types of events may include change of RRC state, cell reselect, timer expiry (periodic LR 103) or motion etc.

Figure 11:
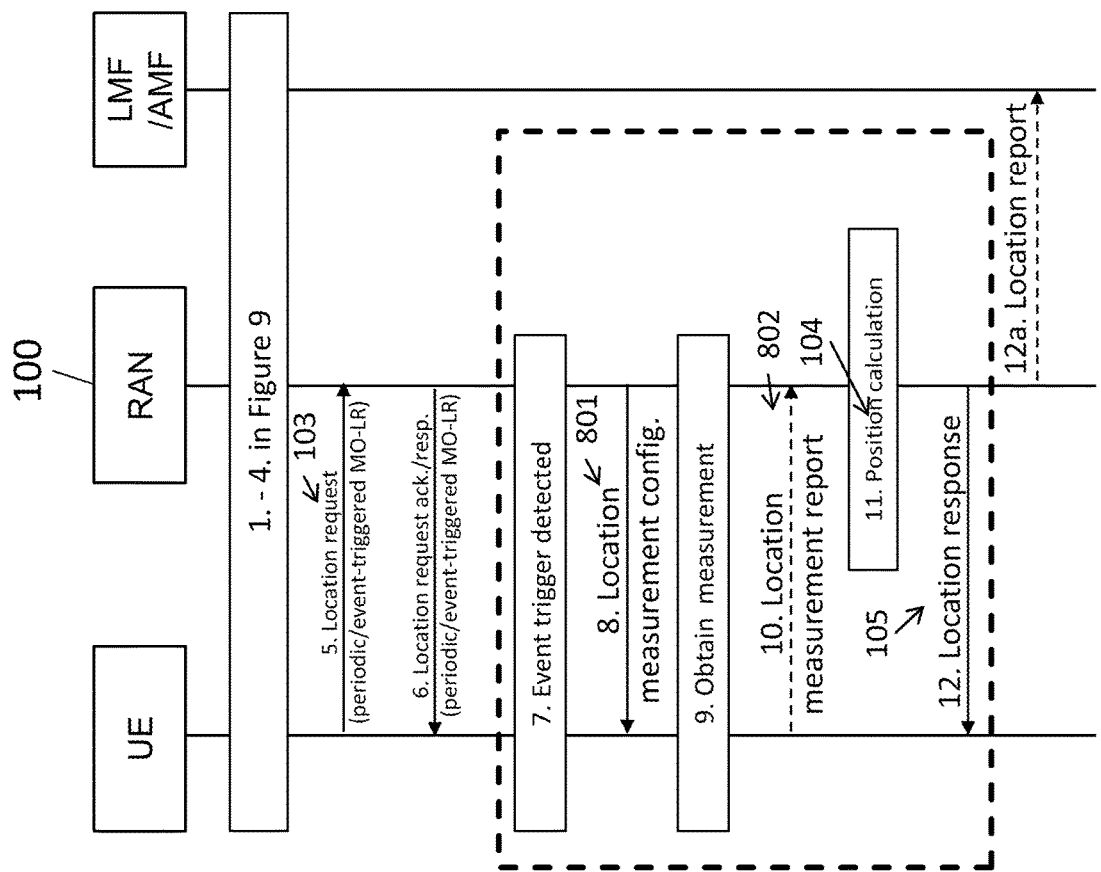
FIG. 11 shows another schematic view of a procedure performed by the LMC according to the present disclosure.
Figure 12:
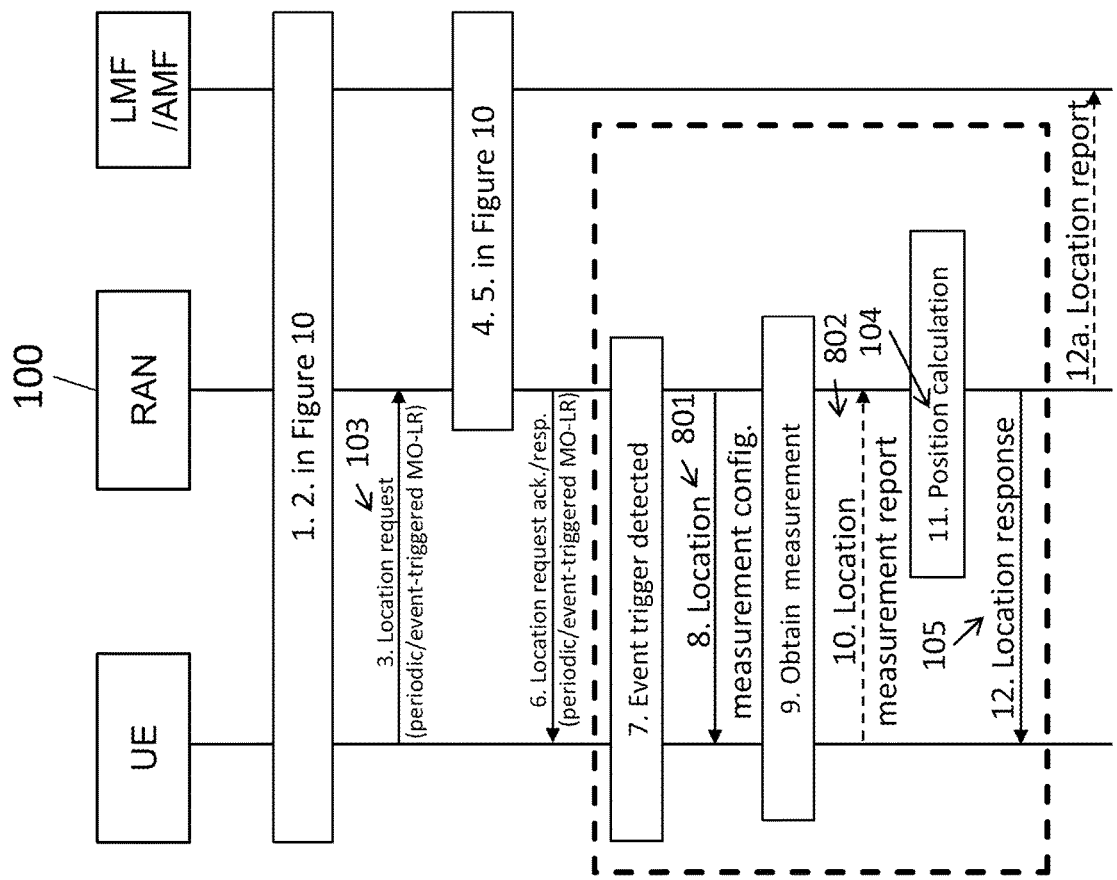
FIG. 12 shows another schematic view of a procedure performed by the LMC according to the present disclosure.

FIG. 11 and FIG. 12 give extensions of FIG. 9 and FIG. 10, respectively, where a MO-LR becomes periodic or event triggered. Upon a specific event detect either at a UE or at a RAN 100, operation 8 to 12, which are constrained within RAN 100, are carried out. RAN 100 may provide a location report to the location server in the CN in a batched manner.

Such a design not only reduces the overall latency but also allows to minimize the time duration where UE stays active, resulting in lower power consumption.

Figure 13:
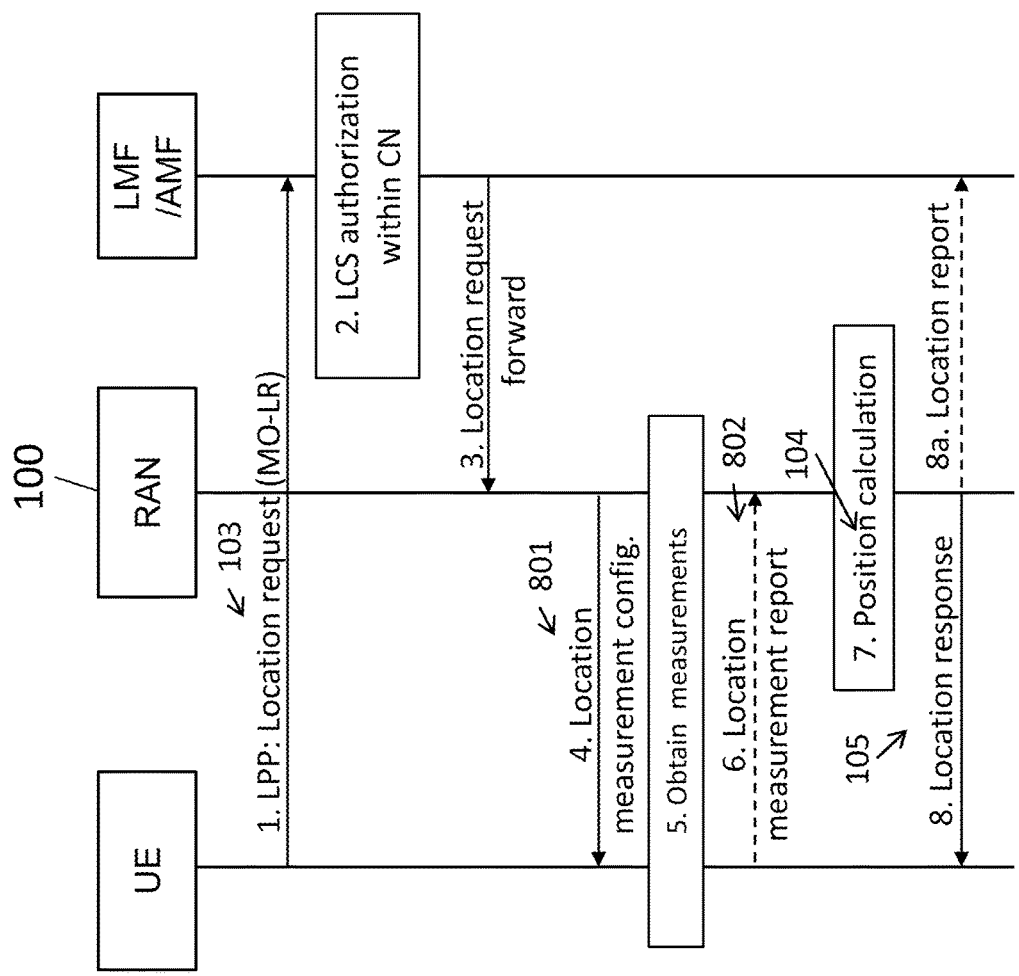
FIG. 13 shows another schematic view of a procedure performed by the LMC according to the present disclosure.
Figure 14:
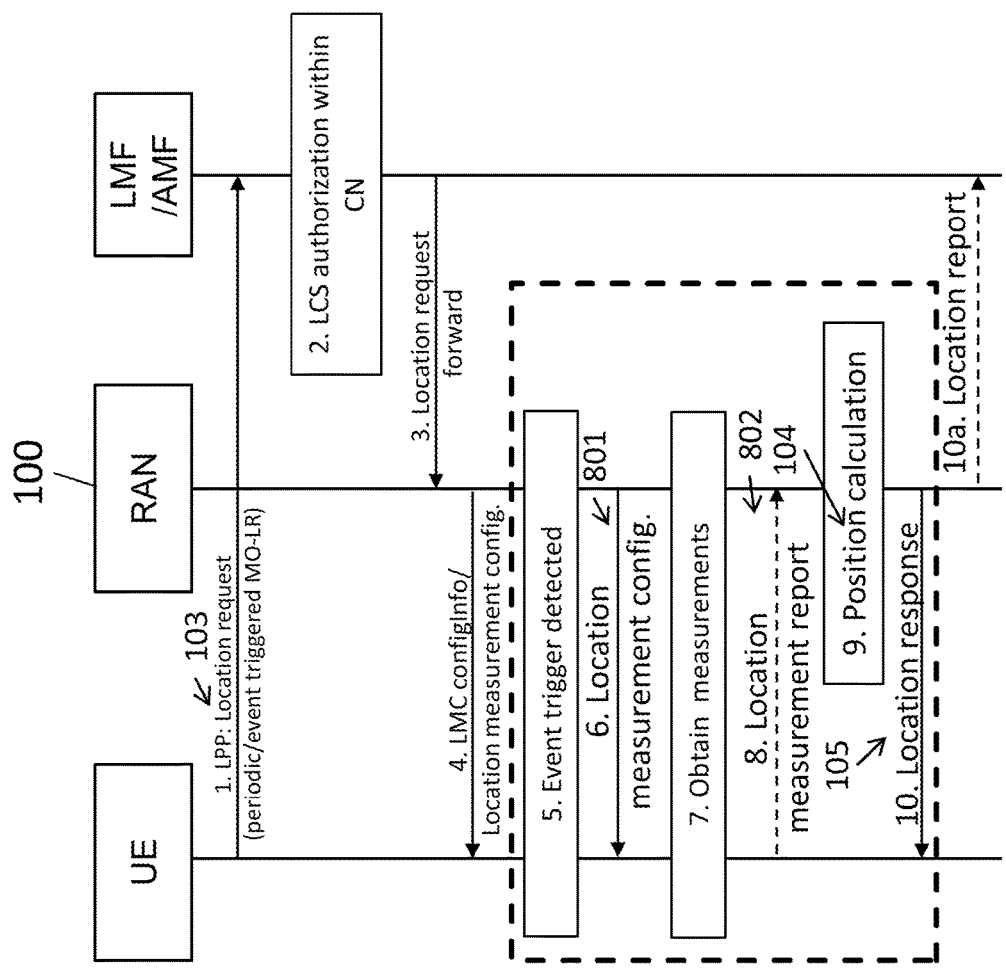
FIG. 14 shows another schematic view of a procedure performed by the LMC according to the present disclosure.

A MO-LR forwarded to RAN-LMC 100 is now going to be described in view of FIG. 13 and FIG. 14.

Without knowledge about a RAN-LMC 100, a UE sends a MO-LR to an AMF/LMF by default, as e.g. shown in FIG. 13 (operation 1). The AMF/LMF may initiate the corresponding LCS authorization procedure (operation 2) and determine the final destination of this LR 103. The LR 103 may be forwarded to a distributed LMF, which is closer to the UE, or as depicted in Operation 3 FIG. 13, to the RAN-LMC 100 where the UE is associated to. The forwarded LR 103 may carry an indicator authorizing the RAN-LMC 100 to carry out the follow-up positioning procedure. Depending on the particular function in the CN forwarding the LR 103, different protocols may be used, e.g. NRPPa from the LMF to the RAN, or the NG-AP from the AMF to the RAN. The LMC 100 in the RAN receives the LR 103 and configures location measurements 801 and reports 802 accordingly (operation 4-6). Based on the location measurements obtained, the RAN-LMC 100 calculates a UE's position 104 (operation 7) and provides a location response 105 directly to the UE (operation 8). Optionally, the RAN-LMC 100 reports the UE's location to the centralized LMF in the CN (operation 8a).

This procedure exploits the location management capability in the RAN and provides the possibility of LCS load balancing. Signaling procedures relate to radio-based measurements are constrained within RAN, resulting in reduced latency and signaling overhead.

Similarly, this procedure can be extended to handle deferred MO-LRs such as periodic/event triggered ones. As shown in FIG. 14, the LMF/AMF forwards the LR 103 to the RAN 100 and informs the RAN 100 about the succeeding procedure such as event handling and UE positioning. After an event is detected, the positioning procedure (operations 6 to 10) is carried out within the RAN. Batched location reports may be provided to the location server in the CN.

Figure 15:
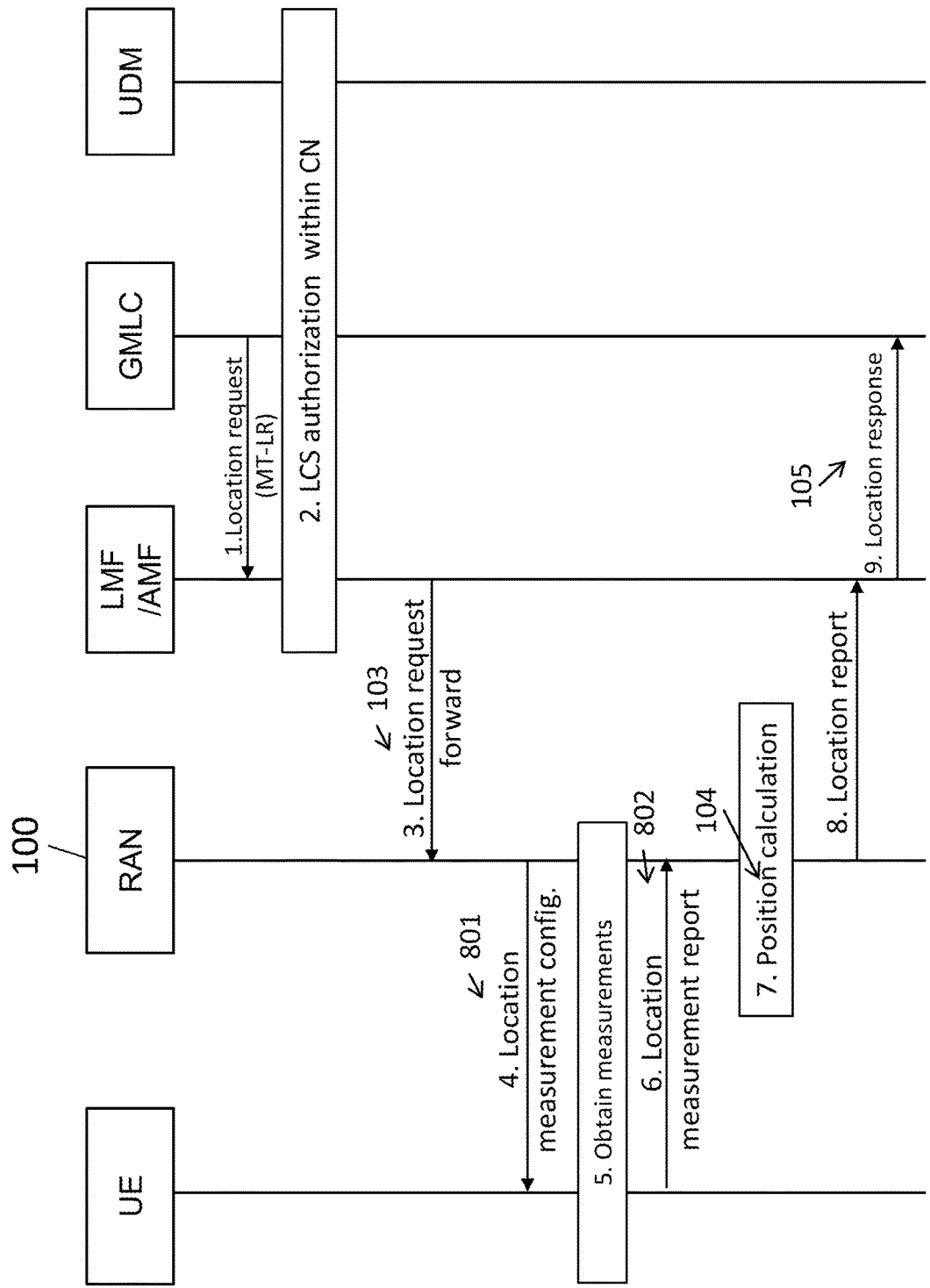
FIG. 15 shows another schematic view of a procedure performed by the LMC according to the present disclosure.
Figure 16:
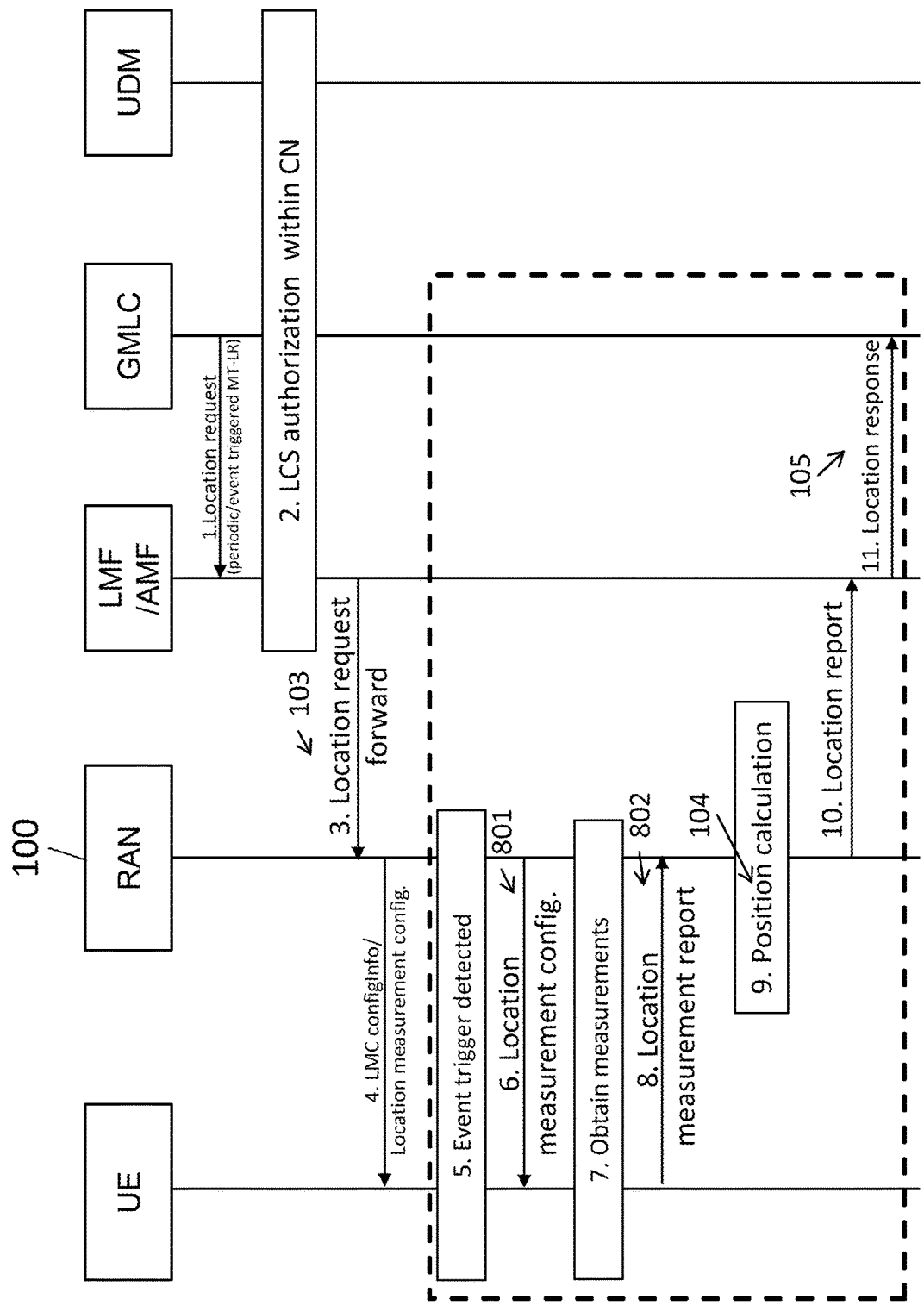
FIG. 16 shows another schematic view of a procedure performed by the LMC according to the present disclosure.

A MT-LR sent to a RAN-LMC 100 (forwarded by an AMF/LMF) is now going to be described in view of FIG. 15 and FIG. 16.

MT-LR refers to an LR 103 originated from the network side. An example of a corresponding signaling procedure is provided in FIG. 15.

For Evolved packet core (EPC), LRs 103 from external clients are first handled by a Gateway Mobile Location Center (GMLC). The LR 103 is forwarded to the network function which offers LCS to other functions, e.g. AMF or LMF, using a service-based interface (operation 1). The LCS authorization procedure can be carried out within the CN, e.g., GMLC requests universal data management (UDM) to perform a privacy check (operation 2). Based on an available LMC capability and LCS traffic load, the AMF/LMC may forward the LR 103 to a distributed LMF closer to the UE, or as depicted in Operation 3 in FIG. 15, to the RAN-LMC 100 which the UE is associated to. The forwarded LR may carry an indicator authorizing the RAN-LMC 100 to carry out the follow-up positioning procedure.

Depending on the particular function in the CN which forwards the LR 103, different protocols may be used, e.g. NRPPa from the LMF to the RAN, or NG-AP from the AMF to the RAN. The LMC 100 in the RAN receives the LR 103 and configures location measurements and reports accordingly (operation 4-6). Based on the location measurements obtained, the RAN-LMC 100 calculates a UE's position (operation 7) and provides a location response to GMLC over AMF/LMF.

This procedure exploits the location management capability in the RAN 100 and provides the possibility of LCS load balancing. Signaling procedures relate to radio-based measurements are constrained within RAN 100, resulting in reduced latency and signaling overhead.

Similarly, this procedure can be extended to handle deferred MT-LRs such as periodic/event triggered ones. As shown in FIG. 16, the LMF/AMF forwards the LR 103 to the RAN 100 and informs the RAN 100 about the succeeding procedure such as event handling and UE positioning. After an event is detected, the positioning procedure (operations 6 to 9) is carried out within the RAN 100.

Figure 17:
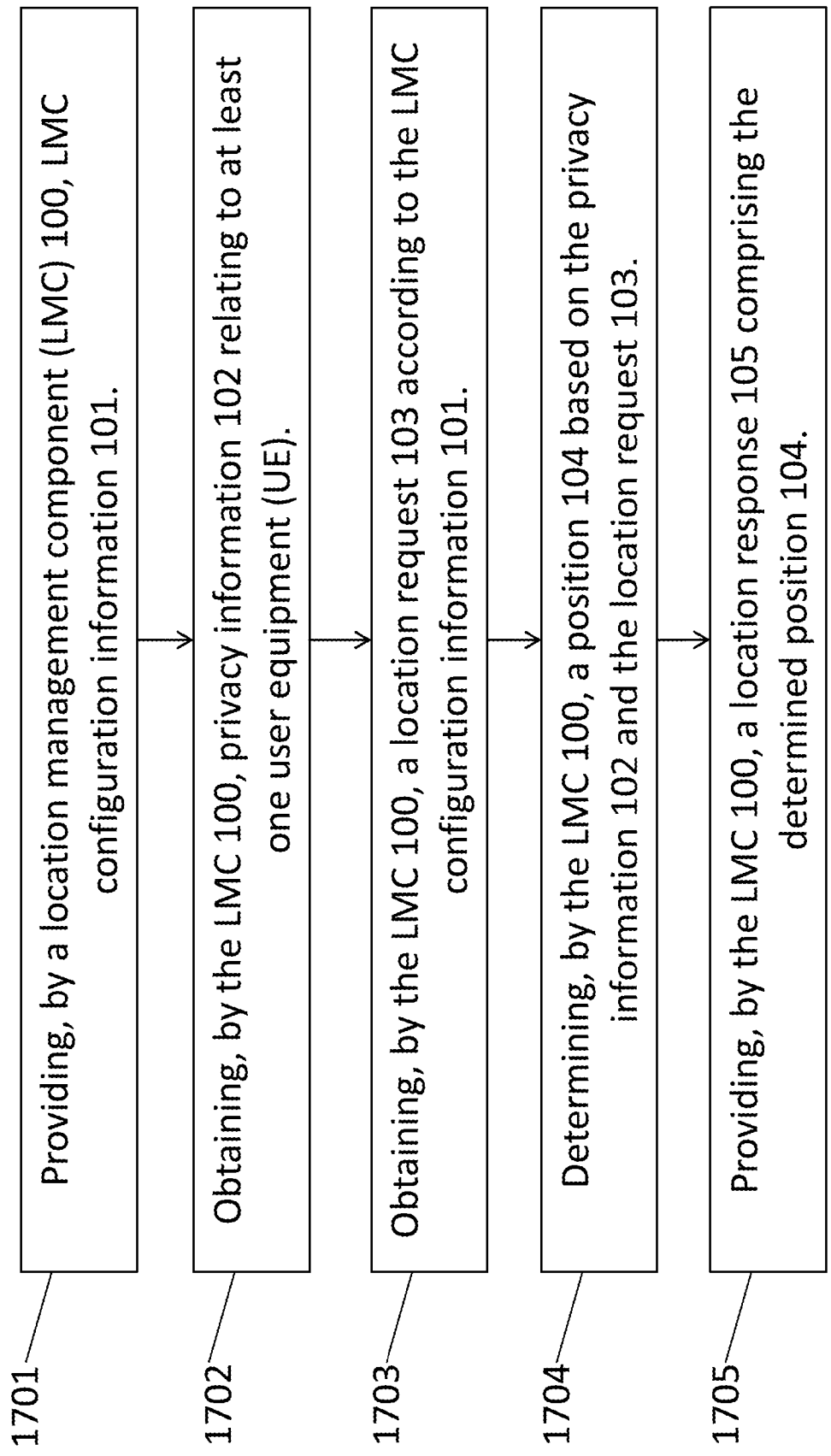
FIG. 17 shows a schematic view of method according to an embodiment of the present disclosure.
Figure 18:
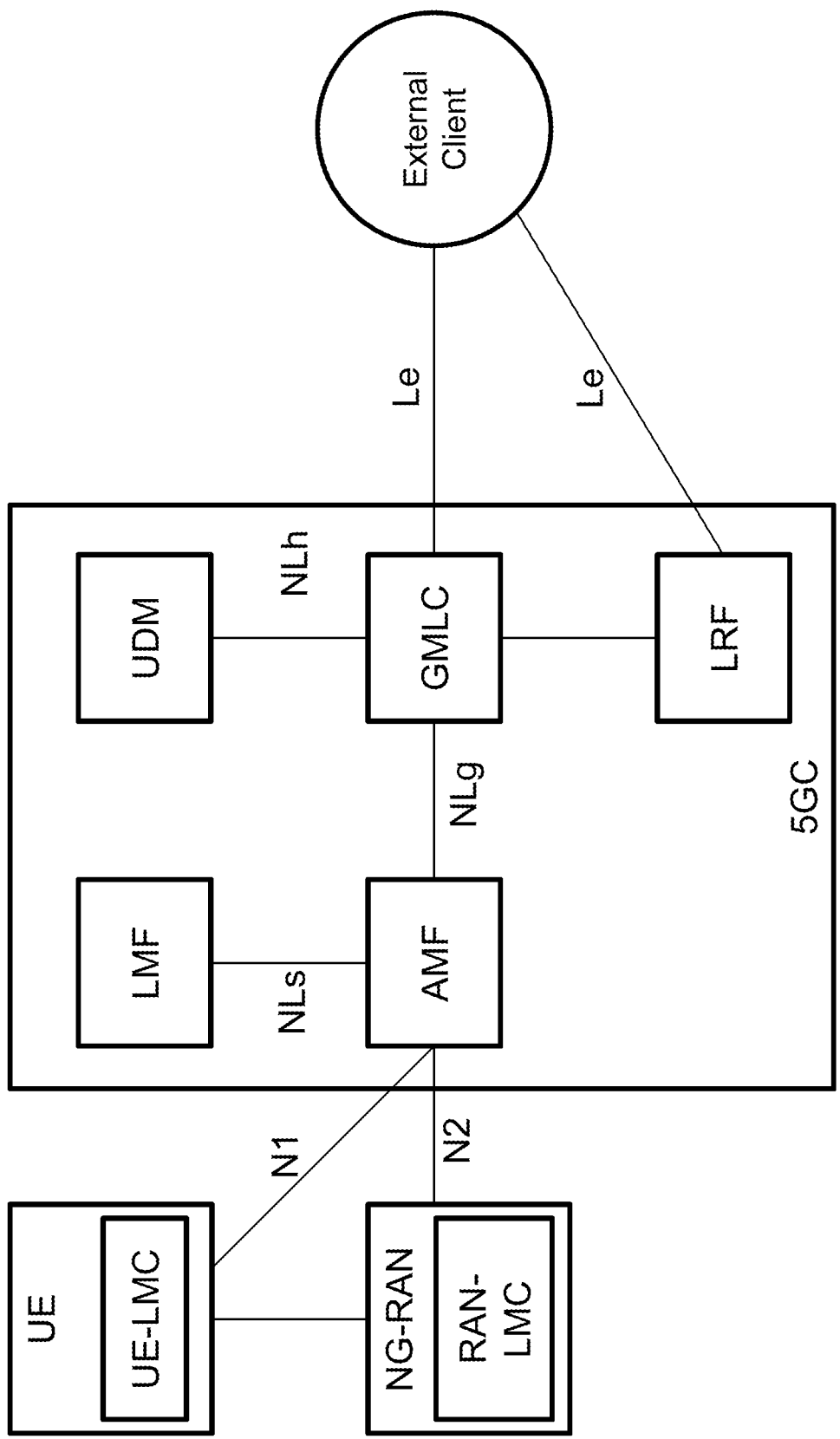
FIG. 18 shows a schematic view of location management according to the conventional technology.
Figure 19:
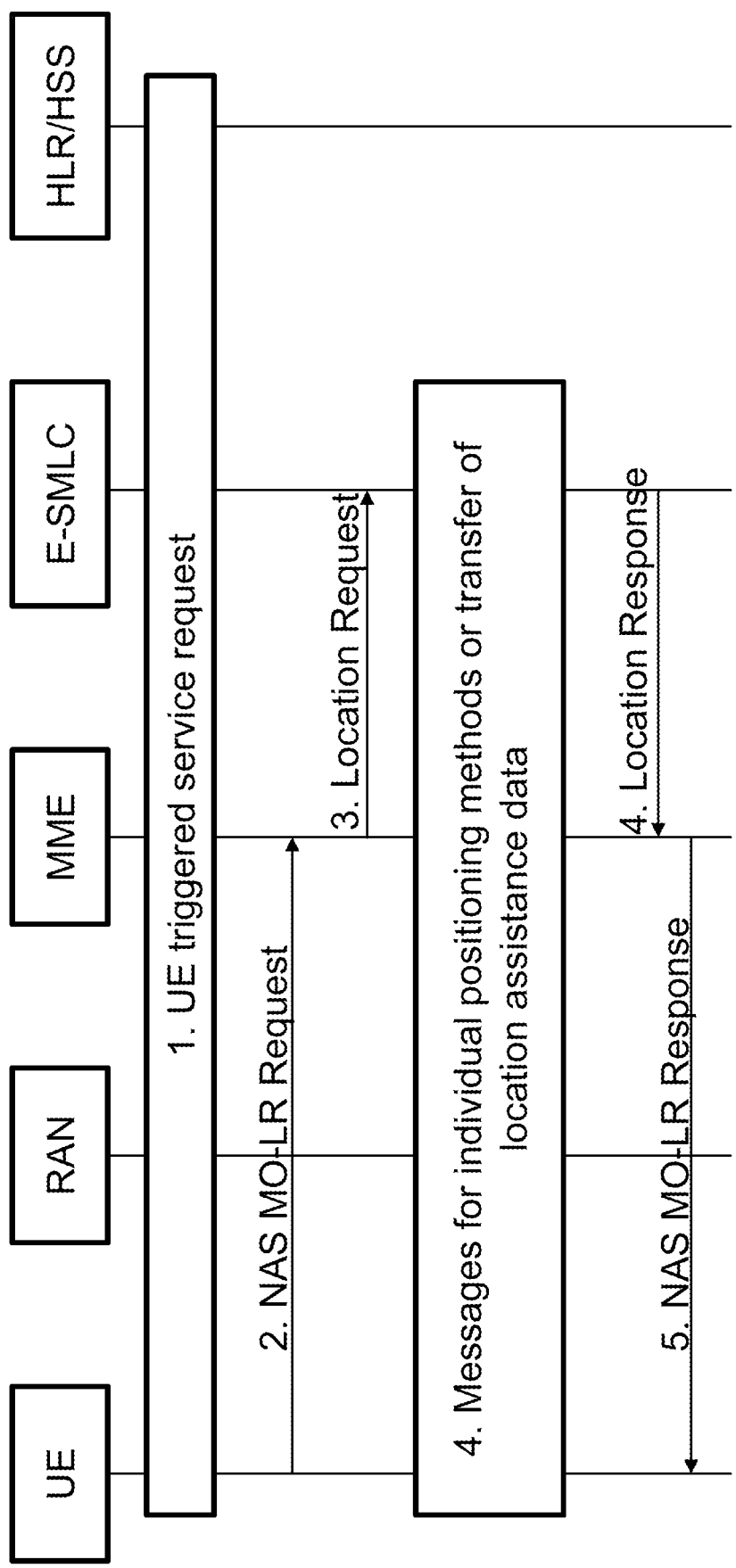
FIG. 19 shows another schematic view of location management according to the conventional technology.
Figure 20:
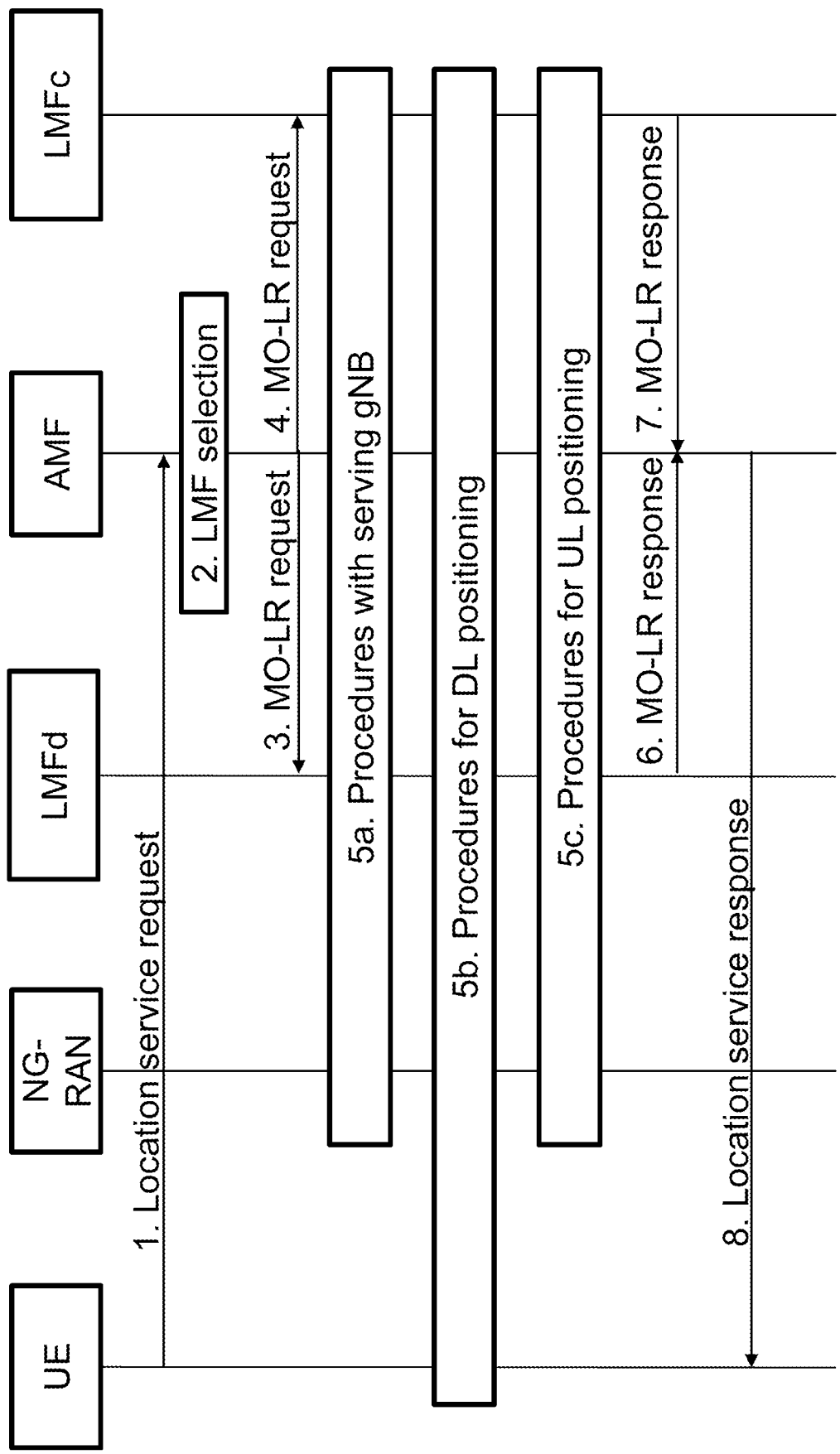
FIG. 20 shows another schematic view of location management according to the conventional technology.

FIG. 17 shows a method 1700 according to an embodiment of the present disclosure. The method 1700 is for operating the LMC 100 according to an embodiment of the present disclosure.

The method comprises a first operation of providing 1701, by an LMC 100, LMC configuration information 101. The method comprises a second operation of obtaining 1702, by the LMC 100, privacy information 102 relating to at least one UE. The method comprises a third operation of obtaining 1703, by the LMC 100, a location request 103 according to the LMC configuration information 101. The method comprises a fourth operation of determining 1704, by the LMC 100, a position 104 based on the privacy information 102 and the location request 103. The method comprises a fifth operation of providing 1705, by the LMC 100, a location response 105 comprising the determined position 104.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or operations and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A location management component (LMC) for a mobile communication network, the LMC comprising:
   at least one processor; and
   a non-transitory memory storing instructions, which when executed by the at least one processor, cause the at least one processor to:
   provide LMC configuration information to at least one user equipment (UE), wherein the LMC configuration information is non UE-specific LMC configuration information, and wherein the LMC configuration information is included in a predefined system information block (SIB),
   obtain privacy information relating to the at least one user equipment (UE),
   obtain a location request according to the LMC configuration information, determine a position of the at least one UE, based on the privacy information and the location request, provide a location response based on the determined position, wherein the location response comprises the determined position.

2. The LMC according to claim 1, wherein the LMC is located in a radio access network (RAN).

3. The LMC according to claim 2, wherein the privacy information authorizes the RAN to obtain the determined position of the UE and provide a service based on the determined position of the at least one UE.

4. The LMC according to claim 1, wherein the instructions further cause the at least one processor to provide the LMC configuration information to the at least one UE.

5. The LMC according to claim 1, wherein the non UE-specific LMC configuration information comprises at least one of the following parameters:
- a capability of the LMC with respect to a target geographical area,
- at least one type of location request allowed at the LMC,
- at least one type of location service (LCS) with at least one quality of service (QoS),
- a resource configuration for location request transmission, or
- a measurement report required by a radio access network (RAN).

6. The LMC according to claim 1, wherein the LMC configuration information is UE-specific LMC configuration information,
wherein the instructions further cause the at least one processor to transmit the LMC configuration information to the at least one UE, and
wherein the LMC configuration information is included in a radio resource control (RRC) message.

7. The LMC according to claim 6, wherein the UE-specific LMC configuration information comprises information indicating at least one of the following:
- a capability of the LMC with respect to a specific UE or a specific group of UEs,
- at least one type of a location request allowed at the LMC,
- at least one type of location service (LCS) with at least one quality of service (QoS),
- a resource configuration for location request transmission, or
- a measurement report required by the radio access network (RAN).

8. The LMC according to claim 1, wherein the instructions further cause the at least one processor to:
provide a location service (LCS)authorization request to a core network (CN), and
obtain an LCS authorization response from the CN,
wherein the LMC is further configured to obtain the privacy information based on the LCS authorization response.

9. The LMC according to claim 1, wherein the obtaining of the privacy information is triggered by a UE, by a radio access network (RAN) or by a core network (CN), and
wherein the LMC configuration information provided by the LMC is UE-specific LMC configuration information.

10. The LMC according to claim 1, wherein the obtaining of the location request according to the LMC configuration information comprises obtaining a mobile originated location request (MO-LR) from a UE, and
wherein the mobile originated location request is included in an RRC message.

11. The LMC according to claim 1, wherein the obtaining of the location request according to the LMC configuration information comprises obtaining a mobile terminated location request (MT-LR) from:
an access and mobility management function (AMF), wherein the mobile terminated location request is included in an application protocol (NGAP) message, or
a location management function (LMF), wherein the mobile terminated location request is included in a positioning protocol (NRPPa) message.

12. The LMC according to claim 1, wherein the providing of the location response comprises providing the location response to a UE, and
wherein the location response is included in an RRC message.

13. The LMC according to claim 1, wherein the providing of the location response comprises providing the location response to an AMF, wherein the location response is included in an NGAP message, or to an LMF, wherein the location response is included in an NRPPa message.

14. The LMC according to claim 1, wherein the instructions further cause the at least one processor to:
provide a location measurement configuration to a UE,
obtain a location measurement report from the UE, and
determine the position according to the location measurement report.

15. The LMC according to claim 1, wherein the instructions further cause the at least one processor to:
provide a registration request,
obtain a registration grant, preferably from the AMF or the LMF, and
provide the LMC configuration information based on the registration grant.

16. The LMC according to claim 15, wherein the registration request is to an access and mobility management function (AMF) or a location management function (LMF).

17. The LMC according to claim 1, wherein the LMC configuration information comprises at least one of an location service (LCS)type, an LCS category, an LCS QoS, a capability level of the LMC, a positioning method, a location measurement type, a location measurement frequency, an LMC active time, an LMC expiry time, a geographical area of the LMC, or a radio access network (RAN) list relating to the LMC.

18. A method for a location management component (LMC) for a mobile communication network, wherein the method comprises the operations of:
providing, by the LMC, LMC configuration information to at least one user equipment (UE), wherein the LMC configuration information is non UE-specific LMC configuration information, and wherein the LMC configuration information is included in a predefined system information block (SIB),
obtaining, by the LMC, privacy information relating to at least one user equipment (UE),
obtaining, by the LMC, a location request according to the LMC configuration information,
determining, by the LMC, a position based on the privacy information and the location request, and
providing, by the LMC, a location response comprising the determined position.

* * * * *